(No Model.)

W. C. ROBY.
NUT LOCK.

No. 442,642. Patented Dec. 16, 1890.

Witnesses:
A. Ruppert.
E. Cruse

Inventor:
William C. Roby,
by [signature], Atty.

UNITED STATES PATENT OFFICE.

WILLIAM C. ROBY, OF HOLY CROSS, COLORADO.

NUT-LOCK.

SPECIFICATION forming part of Letters Patent No. 442,642, dated December 16, 1890.

Application filed January 6, 1890. Serial No. 336,024. (No model.)

*To all whom it may concern:*

Be it known that I, WILLIAM C. ROBY, of Holy Cross, in the county of Eagle and State of Colorado, have invented certain new and useful Improvements in Nut-Locks, of which the following is a specification, reference being had to the accompanying drawings, and to the letters of reference marked thereon.

The object and nature of my invention will be fully set forth in the following specification and claim.

Figure 1:
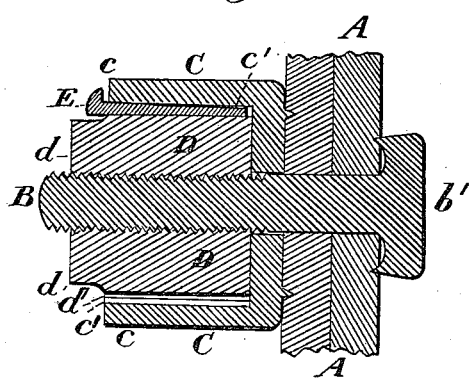
Figure 2:
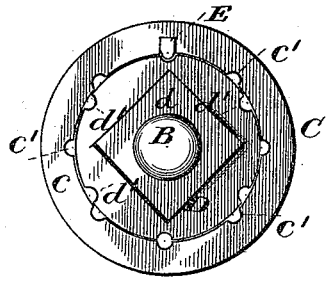
Figure 3:
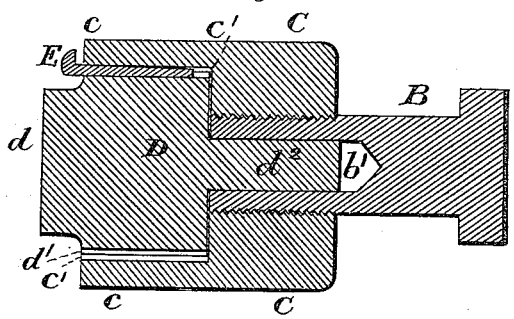
Figure 4:
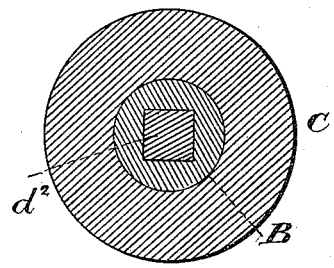

In the accompanying drawings, Figure 1 is a longitudinal section through a bolt, a hooded washer or nut, and a jam-nut. Fig. 2 is an end view; Fig. 3, a longitudinal section of a modification; Fig. 4, an end view of the same.

Similar letters of reference indicate similar parts in the respective figures.

A represents two plates or bodies to be bolted together. B is the bolt, C a hooded washer or nut, and D the jam or locking nut. The head of the bolt $b$ is prevented from turning on the plates A by any ordinary means, and if C is a washer adapted to slip over the threaded end of the bolt it will also be prevented from turning on the plates A by any ordinary means. If, however, it is a nut adapted to screw on the bolt B, no other provision will be necessary to prevent its turning on the plates A. In Fig. 1 the hood $c$ of the nut or washer C is cylindrical, and the nut D also cylindrical as to its main body, but provided with a squared head $d$ to receive a monkey-wrench. The nut D, when being screwed on the bolt, turns freely within the hood of the nut or washer C, and its cylindrical portion is in length equal, or nearly so, to the depth of the hood $c$.

On the interior of the hood $c$ I form a series of grooves $c'$, which may extend the whole depth of the hood or only a part of it. Eight of these grooves are shown; but I do not limit myself to any particular number. I also form on the exterior of the cylindrical part of the nut D a series of grooves $d'$ in length equal or about equal to those in the hood $c$. The number of grooves in the nut D may be either greater or less than that of the grooves in the hood, as my object is to apply the "Vernier" principle to this matter. In the drawings I have illustrated six; but do not limit myself to any particular number. There being six grooves in one surface and eight in the opposing surface, two of the opposing grooves will register at every one-forty-eighth of a revolution.

E is a locking device to be inserted in the hole formed by two opposing grooves when they register. The locking device may be a removable pin, or, if the lock is to be permanent, solder or other similar substances may be used.

In Fig. 3 the bolt B is provided with a square hole $b'$, extending longitudinally from the end of its threaded portion. Here C is shown as a hooded nut and screws upon the bolt B, and the jam-nut D is provided with a square shank $d^2$, adapted to fit in the square hole $b'$ in the bolt, the nut D fitting within the hood $c$ of the nut C. The hood $c$ and nut D are provided with vernier-grooves, the same as described with reference to Figs. 1 and 2, the only difference in the operation being that in the device illustrated in Fig. 3 the nut C is turned to cause two of the opposing grooves to register, whereas in Fig. 1 the nut D is turned to accomplish this end.

Having described my invention, I claim—

The combination, with a bolt, of a locking device consisting of a washer and a nut, one of which is hooded and adapted to inclose the other, the interior surface of said hood being provided with a series of grooves and the exterior surface of the inclosed member being also provided with a series of grooves unequal in number to the grooves in the hood, and a device, substantially as described, adapted to be inserted in the hole formed by two opposing grooves when they register, for the purpose specified.

In testimony whereof I have hereunto set my hand and seal.

WILLIAM C. ROBY. [L. S.]

Witnesses:
A. R. BROWN,
W. H. GASKILL.